United States Patent Office 3,170,102
Patented Feb. 16, 1965

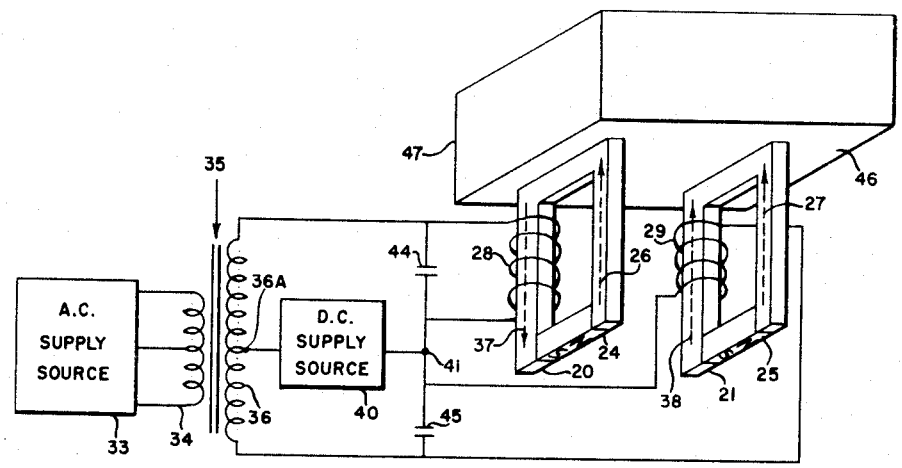

3,170,102
ULTRASONIC TRANSDUCERS
Channing W. Hayes, Davenport, Iowa, assignor to The Bendix Corporation, a corporation of Delaware
Original application July 2, 1957, Ser. No. 669,562. Divided and this application Nov. 23, 1959, Ser. No. 858,303
1 Claim. (Cl. 318—118)

This invention relates to means for energizing ultrasonic transducers and especially to ultrasonic transducers of the type employed in ultrasonic cleaners and is a divisional case of the applicant's abandoned application Serial No. 669,562, filed July 2, 1957, for Ultrasonic Transducers.

An object of the invention is to provide means for energizing such transducers so that they will present a balanced load to their energizing power source.

Magnetostrictive transducers comprise electrical energizing windings magnetically coupled to a core of magnetostrictive material, a material which changes in dimension when subjected to a variable electrical field and a variable magnetic field in particular. The dimensional change is not dependent upon the polarity of the magnetism so that if the core is magnetized in one direction of polarity, then demagnetized, magnetized in the opposite direction of polarity, and again demagnetized as by the application of one cycle of alternating electrical power to the transducer winding, the core will undergo two cycles of dimensional change. This frequency doubling in the conversion of electrical power variation to mechanical motion cannot be tolerated in practical magnetostrictive ultrasonic wave generators since a reasonable degree of dimensional change in the core will be provided only when the core is mechanically resonant at the frequency of the alternating magnetizing voltage.

Such frequency doubling is prevented by subjecting the transducer core to a unidirectional magnetism greater in magnitude than the peak magnitude of the alternating magnetism to which the core is simultaneously subjected, whereby the resultant magnetism is prevented from reversing in polarity. However, this unidirectional magnetism introduces the problem of unequal loading in the alternating electrical power source during successive one half cycles of supply alternation. One object of the invention is to overcome this problem.

The curve of magnetism in a magnetostrictive core plotted against magnetizing force is not linear; instead successive equal increments of increasing magnetizing force produce successively decreasing increments of magnetism in the core. When the core is subjected to an alternating magnetizing force superimposed on a unidirectional magnetizing force, the alternating electrical power source is required to supply different amounts of both real and reactive power in successive half cycles of the supply cycle. The significance of such unequal loading in connection with various types of electrical and electronic generators is well understood and need not be discussed here especially since the invention overcomes the problem.

Another object is to provide means for energizing transducers which can be employed with single-ended electronic generators and amplifiers having two terminal output circuits.

A further object is to provide an improved ultrasonic cleaner in which the transducers present a balanced load to the electrical power source.

These objects are realized in the invention by subjecting one or more pairs of transducers to a unidirectional electrical field, while subjecting them to an alternating electrical field which opposes the unidirectional field in one transducer of a pair while aiding the unidirectional field in the other transducer. When magnetostrictive transducers are employed, means are provided for unidirectionally magnetizing both transducers of a pair and energizing the winding of one transducer to aid and then oppose the unidirectional magnetism in successive half cycles of supply alternation while energizing the winding of the other transducer to oppose and aid the unidirectional magnetism in said successive half cycles respectively.

Other objects and advantages of the invention will be apparent from the following description of an embodiment of the invention illustrated in the accompanying drawing, it being understood that various modifications other than those shown may be made in the embodiment illustrated and that other embodiments are possible without departing from the spirit of the invention or the scope of the appended claim.

In the drawings:

FIG. 1 is a schematic illustration of an embodiment of the invention;

FIG. 2 is a schematic illustration of a modification of the embodiment illustrated in FIG. 1;

FIG. 3 is a graph showing the relation between magnetism in a magnetostrictive transducer core and the magnetizing forces.

Referring to FIG. 3, the slope of the magnetization curve 10 decreases as the magnetizing force applied to a magnetostrictive transducer core is increased. In this graph magnetism is plotted on the ordinate axis and magnetizing force is plotted on the axis of the abscissa. The point B, midway along the axis of the abscissa, represents the magnitude of the unidirectional magnetizing force applied to the transducer and which results in magnetism E on the ordinate axis. An alternating magnetizing force 11, added to the unidirectional force B, provides a resultant force which varies between forces A and C, equidistant from force B. The core magnetism varies between magnetism F, substantially below the unidirectional value E, and magnetism D, only a little above the value E on the ordinate axis. The difference in distances $E-F$ and $E-D$ represents the degree of unbalance in the load which the transducer presents to the alternating electrical supply generator.

In the invention, the unbalance in each transducer is unchanged. However, some number of pairs of transducers is connected to the generator so that the alternating electrical field applied to one transducer of each pair adds to its unidirectional electrical field while the alternating electrical field applied to the other transducer of each pair subtracts from its unidirectional field. The means provided in the invention, in the case of magnetostrictive transducers, for applying the magnetic fields to the transducers in this way, include means for applying unidirectional magnetizing forces to both transducers and means for applying alternating magnetizing forces to both transducers, of each pair.

The means for applying unidirectional magnetism to the transducer may comprise a permanent magnet magnetically coupled to the transducer core of electromagnetic means for inducing magnetism in the core. Use of permanent magnets overcomes the need for supplying a unidirectional magnetizing current to magnetizing windings whereas the use of such windings magnetically coupled to the core avoids the problem of providing a core with the desired permeability. Thus both of these ways to provide the unidirectional magnetism has advantages and advantageously may be employed together as shown in FIG. 1.

Rather than being integrally formed or joined in a single unit, in the form selected for illustration in FIG. 1 the transducer cores are formed as separate units 20 and 21. Advantageously, the cores are provided with a window, as shown, so that the core material forms a continuous magnetic flux path around the window.

The upper ends of the core units engage the wall 46 of an ultrasonic cleaning liquid container 47. Permanent magnets 24 and 25 form part of core units 20 and 21 respectively. They are included in the flux path of their respective cores and advantageously may be located at the lower end of the core, as shown. The unidirectional flux caused by these permanent magnets is represented by arrow 26 in core 20 and arrow 27 in core 21. Consistent with the direction of arrows 26 and 27, the north and south poles of magnets 24 and 25 are marked N and S.

Windings 28 and 29, which encircle a leg of cores 20 and 21 respectively, are connected in series circuit with one another across an alternating electrical power source whose frequency of alternation advantageously corresponds to the mechanical resonant frequency of the transducer cores. The source may comprise an A.C. power source 33 connected to the primary winding 34 of a transformer 35 whose secondary winding 36 is connected at its ends to the ends of the series transducer winding circuit. The winding direction of the turns of windings 28 and 29 is selected and arranged so that alternating currents flowing through said winding from the power source result, in one half cycle of supply alternation, in induction in cores 20 and 21 of an alternating magnetic flux which aids the unidirectional flux 26 in core 20 and opposes the unidirectional flux 27 in core 21, as indicated by magnetic flux arrows 37 and 38 in cores 20 and 21 respectively. During the succeeding one half cycle of supply alternation this flux and the direction of arrows 37 and 38 is reversed. It will be apparent that the load seen by the alternating electrical power source 33 has the same magnitude during both half cycles of the supply alternation. During both half-cycles the alternating component of magnetism aids the unidirectional component in one core and opposes it in the other.

FIG. 1 includes both magnetic and electro-magnetic means for unidirectionally magnetizing the transducer cores. The magnetic means includes permanent magnets 24 and 25. Said electromagnetic means, whether the permanent magnets are employed or not, may include the same windings by which the alternating magnetism is induced in the transducer cores. FIG. 1 illustrates one convenient circuit arrangement for utilizing this feature. A unidirectional source of electrical power 40 is connected from the mid-tap 36a of the transformer secondary winding 36 to a junction 41 in the series circuit between the transducer windings 28 and 29. The inclusion in the circuit of unidirectional source 40 has no effect on the flow of alternating currents because mid-tap 36a and junction 41 have identical alternating potentials. However, windings 28 and 29 are connected in parallel across the source 40 and unidirectional currents will flow in each of them. The direction of this flow is opposite in the respective halves of secondary winding 36 so that magnetism induced in the core of transformer 35 will cancel and the transformer operation will not be effected.

Windings 28 and 29 are wound in opposite directions relative to the alternating power source and in like direction relative to the unidirectional power source. When the unidirectional power source 40 is polarized so that junction 41 is negative, application of the electrical "right hand" rule will show that the unidirectional currents in the transducer windings 28 and 29 will induce magnetic flux in the transducer cores to aid the flux produced by permanent magnets 24 and 25 during one half cycle of magnetic variation. The arrows 26 and 27 represent the resultant unidirectional flux at that time.

The capacitors 44 and 45, which are connected in parallel with transducer windings 28 and 29 respectively, may be employed, as shown, to add capacitive reactance to the inductive reactance of the transducer windings, thereby increasing the power factor of the load as seen from the alternating power source.

The upper ends of cores 20 and 21 being attached to the wall 46 of an ultransonic cleaner liquid container 47, the container and cleaning liquid will be subjected to ultrasonic wave action to provide a cleaning action in the liquid as described in U.S. Patent No. 2,815,193 granted December 3, 1957 to Gilbert G. Brown.

In operation of the circuit shown in FIG. 1, the transducer cores 20 and 21 are subjected simultaneously to both unidirectional and alternating magnetism. The unidirectional component of the resultant magnetism is greater than the alternating component so that the resultant magnetism does not reverse in polarity. However, because it increases in one transducer core while it decreases in the other, one core will become smaller in dimension as a result of magnetostrictive action while the other becomes larger. Accordingly the magnetostrictive action of the respective transducers and the ultrasonic waves transmitted from them to the wave conducting medium 23 are out-of-phase with one another.

In FIG. 1, the transducers are magnetized so that the unidirectional and alternating components of core magnetism aid in one core and are opposed in the other core during one half of the alternating power supply cycle and only the alternating component of magnetism is reversed in successive one-half cycles of the supply cycle. The same relation between the unidirectional and alternating components of magnetism exists in the cores 50 and 51 of transducers 52 and 53 in FIG. 2.

The circuit shown in FIG. 2 does not require a center-tapped transformer. In it, alternating currents flow to the transducer windings in parallel and unidirectional currents flow through the windings in series. The alternating electrical power source comprises an A.C. power source 60 whose output is connected to the primary winding 61 of a transformer 62. One end of the transformer secondary winding 63 is connected to a common point or ground 64 and its other end is connected through a power factor increasing and unidirectional current blocking capacitor 65 to a junction 66. Transducer windings 54 and 55 are connected in parallel between junction 66 and the ground 64. The circuit through winding 55 advantageously includes an A.C. by-pass capacitor 67 between the winding 55 and ground which offers negligible impedance to the alternating current flow but does block passage of unidirectional current from a unidirectional power source, D.C. source 68, advantageously connected in series with an inductor choke 69 across the A.C. by-pass capacitor 67. The unidirectional current flow path extends from D.C. source 68 through choke 69 and winding 54, thence past junction point 66 and through winding 55 and back to the source 68.

Choke 69 prevents flow of alternating currents through source 68 and capacitor 67 provides a path for such currents around source 68. When the source 68 has low impedance to alternating currents, or if a similar impedance is inserted in series with winding 54 between junction 66 and the ground connection so that the transducer winding circuits are balanced, both the choke 69 and by-pass capacitor 67 may be omitted.

Application of the "right-hand" rule, shows that the alternating magnetism increases and decreases in both of the cores 50 and 51 at the same time.

I claim:

Ultrasonic wave generating apparatus comprising first and second transducers each comprising a magnetostrictive core and an energizing winding, first and second electrical capacitors, a unidirectional power source comprising means for opposing the flow of alternating currents therethrough, an alternating electrical power source having connected from one of its terminals to the other the series circuit combination of one of said electrical capacitors and one of said energizing windings, said other electrical capacitor and said other energizing winding being connected in series from said other terminal of said alternating current source to the junction of said one electrical capacitor and said one energizing winding, and said unidirectional power source being connected across said other electrical capacitor.

References Cited in the file of this patent

UNITED STATES PATENTS

| | | |
|---|---|---|
| 2,044,807 | Norzes | June 23, 1936 |
| 2,323,441 | Baird | July 6, 1943 |
| 2,714,186 | Henrich | July 26, 1955 |
| 2,858,108 | Wise et al. | Oct. 28, 1958 |
| 2,922,999 | Carlin | Jan. 26, 1960 |